United States Patent
Kallio et al.

(10) Patent No.: US 7,898,990 B2
(45) Date of Patent: Mar. 1, 2011

(54) METHOD, SYSTEM AND GATEWAY DEVICE FOR ENABLING INTERWORKING BETWEEN IP AND CS NETWORKS

(75) Inventors: Juha Kallio, Helsinki (FI); Markku Jylhä-Ollila, Helsinki (FI); Jari Mutikainen, Helsinki (FI)

(73) Assignee: Spyder Navigations L.L.C., Wilmington, DE (US)

( * ) Notice: Subject to any disclaimer, the term of this patent is extended or adjusted under 35 U.S.C. 154(b) by 1329 days.

(21) Appl. No.: 10/442,183

(22) Filed: May 21, 2003

(65) Prior Publication Data

US 2004/0190498 A1    Sep. 30, 2004

Related U.S. Application Data

(60) Provisional application No. 60/456,953, filed on Mar. 25, 2003.

(51) Int. Cl.
| H04L 12/16 | (2006.01) |
| H04L 12/66 | (2006.01) |
| H04M 3/42 | (2006.01) |
| G06F 15/16 | (2006.01) |

(52) U.S. Cl. .................. 370/261; 370/352; 379/210.01; 709/204

(58) Field of Classification Search ......... 370/351–356, 370/401, 259–262; 379/900, 210.01; 709/204
See application file for complete search history.

(56) References Cited

U.S. PATENT DOCUMENTS

| 6,584,093 B1 * | 6/2003 | Salama et al. ............... 370/351 |
| 6,731,630 B1 * | 5/2004 | Schuster et al. ............. 370/356 |
| 2002/0024943 A1 * | 2/2002 | Karaul et al. ............... 370/338 |
| 2003/0026245 A1 | 2/2003 | Ejzak |
| 2003/0063590 A1 * | 4/2003 | Mohan et al. ............... 370/338 |
| 2003/0076815 A1 * | 4/2003 | Miller et al. ................ 370/352 |
| 2003/0088619 A1 * | 5/2003 | Boundy ...................... 709/204 |
| 2003/0108000 A1 * | 6/2003 | Chaney et al. .............. 370/260 |

FOREIGN PATENT DOCUMENTS

EP    1 161 104 A1    12/2001

* cited by examiner

Primary Examiner—Aung S Moe
Assistant Examiner—Kerri M Rose

(57) ABSTRACT

A method, system and gateway device enables interworking between an IP-based network and a circuit-switched network. A first address information of a first connection end located in the circuit-switched network is routed in a trigger message from the IP-based network to a gateway control function. The first and second call legs are established in parallel towards the first connection end based on the first address information, and towards a second connection end located in the IP-based network based on a second address information obtained from the trigger message. A single connection between the two connection ends is then established by connecting the first and second call legs. Thereby, IP-based signaling functionality can be used to add capability for subscribers located in the CS domain to be invited into conferences or calls with subscribers located in an IP-based domain, e.g. the IMS domain.

26 Claims, 7 Drawing Sheets

METHOD, SYSTEM AND GATEWAY DEVICE FOR ENABLING INTERWORKING BETWEEN IP AND CS NETWORKS

CROSS-REFERENCE TO RELATED APPLICATIONS

This application claims priority of U.S. Provisional Application Ser. No. 60/456,953 entitled, "Method, System and Gateway Device for Enabling Interworking Between IP and CS Networks," filed Mar. 25, 2003, the entire contents of which are incorporated herein by reference.

BACKGROUND OF THE INVENTION

1. Field of the Invention

The present invention relates to a method, system and gateway device for enabling interworking between an Internet Protocol (IP) network, such as an IP Multimedia Subsystem (IMS) network, and a circuit-switched (CS) network, such as a Global System for Mobile Communication (GSM) network.

2. Description of the Related Art

In order to achieve access independence and to maintain a smooth interoperation with wired terminals across the Internet, an IP multimedia subsystem (IMS) core network as specified e.g. in the 3GPP (Third Generation Partnership Project) specification TS 23.228 has been developed to be conformant to IETF (Internet Engineering Task Force) "Internet Standards". The IMS enables network operators of mobile or cellular networks to offer their subscribers multimedia services based on and built upon Internet applications, services and protocols. The intention is to develop such services by mobile network operators and other third party suppliers including those in the Internet space using the mechanisms provided by the Internet and the IMS. The IMS thus enables conversion of, and access to, voice, video, messaging, data and web-based technologies for wireless users, and combines the growth of the Internet with the growth in mobile communications.

IETF and 3GPP are working on a Session Initiation Protocol (SIP) conferencing service. The goal is to define how conferencing type of services can be established between 3GPP compliant SIP terminals. Simultaneously with this work, another study is underway as to how the interworking between 3GPP IMS and legacy circuit-switched (CS) core network domains can be achieved. A cellular network, i.e. a Public Land Mobile Network (PLMN) can be regarded as an extension of networks with CS domains and packet switched (PS) domains within a common numbering plan and a common routing plan. The PLMN infrastructure is logically divided into a core network (CN) and an access network (AN) infrastructure, while the CN infrastructure is logically divided into a CS domain, a PS domain and an IMS. The CS and PS domains differ by the way they support user traffic. These two domains are overlapping, i.e. they contain some common entities. A PLMN can implement only one domain or both domains. In particular, the CS domain refers to the set of all CN entities offering CS type of connections for user traffic as well as all the entities supporting the related signaling. A CS type of connection is a connection for which dedicated network resources are allocated at the connection establishment and released at the connection release. The PS domain refers to the set of all CN entities offering PS type of connections for user traffic as well as all the entities supporting the related signaling. A PS type of connection transports the user information using autonomous concatenation of bits called packets, wherein each packet can be routed independently from the previous one. The IMS domain includes all CN elements for provision of IP multimedia services including audio, video, text, chat, etc. and a combination of them delivered over the PS domain.

So far, conferencing has been considered from IMS point of view where simultaneously communicating parties are IMS subscribers with IMS subscription. This scope enables the full end to end use of SIP between the participants. SIP is an application-layer control protocol for creating, modifying and terminating sessions with one or more participants. These sessions include Internet multimedia conferences, Internet telephone calls and multimedia distribution. Members in a SIP session can communicate via multicast or via a mesh of unicast relations, or a combination of these. In the full end to end use of SIP no specific requirements for interworking between non-SIP users, not having a SIP capable terminal equipment, have been considered.

However, interworking between IMS and CS domains and between SIP-based conferencing and CS domains has not been considered yet. Basically this would allow conferencing participants to be selected also from a CS domain, i.e. regular telephone users such as users of second or third generation mobile networks, fixed public-switched telephone networks (PSTN) or fixed integrated services digital networks (ISDN).

SUMMARY OF THE INVENTION

The invention, in one embodiment, provides a method and system for enabling interworking between IMS and CS domains, initiated by an IMS subscriber having a SIP enabled terminal device or user equipment (UE).

A method for enabling interworking between an IP-based network and a circuit-switched network is provided. The method includes the steps of:

forwarding a first address information of a first connection end located in the circuit-switched network in a trigger message routed from the IP-based network to a gateway control function;

establishing a first call leg towards the first connection end based on the first address information;

establishing a second call leg towards a second connection end located in the IP-based network based on a second address information obtained from the trigger message; and connecting the first and second call legs to form a single connection.

Additionally, a gateway device for enabling interworking between an IP-based network and a circuit-switched network is provided. The gateway device is configured to receive from the IP-based network a trigger message including a first address information and a second address information, and in response to the trigger message establish a first call leg towards a first connection end located in the circuit-switched network, based on the first address information, and establish a second call leg towards a second connection end located in the IP-based network, based on the second address information.

Furthermore, a network system for enabling interworking between different networks is provided. The system includes a circuit-switched network, an IP-based network, and the gateway device as defined above.

Accordingly, IP-based signaling functionality can be used to add capability for subscribers located in the CS domain to be invited into conferences or calls with subscribers located in an IP-based domain, e.g. the IMS domain. The interworking can be achieved by establishing two parallel connections or call legs and connecting these call legs to a single session or connection between the circuit-switched network and the IP-based network.

The trigger message may be an SIP Refer message, which may include the first address information in a Refer-to header and the second address information in a Referred-by header. In particular, the first address information may be an SIP Uniform Resource Indicator with a telephone information, e.g. a telephony URI (TEL URI).

The interworking may be used to set up a dial-in type of SIP conferencing and to add a participant at the first connection end to the conference.

Furthermore, the gateway control function may be used to represent the first connection end in the IP-based network, and to set up a circuit-switched call towards the first connection end. Then, an in-band indication may be provided to the first connection end during the establishment of the second call leg. The in-band indication may be provided by a media gateway function, e.g. an MGW of an IMS network.

A subscriber identity may be requested from the first connection end, and the first address information may be checked based on the requested subscriber identity which may be a Connected Line identity.

The connecting step may include the step of connecting user plane connections of the first and second call legs together in the media gateway function controlled by the gateway control function.

Additionally, the connecting step may include mapping the trigger message to an initial address message, such as an ISDN User Part (ISUP), Initial Address Message (IAM), of the circuit-switched network.

BRIEF DESCRIPTION OF THE DRAWINGS

The present invention will now be described on the basis of a preferred embodiment with reference to the accompanying drawings in which.

DETAILED DESCRIPTION OF THE PREFERRED EMBODIMENTS

The preferred embodiment will now be described on the basis of a SIP conferencing functionality in an IMS network environment.

Figure 1:
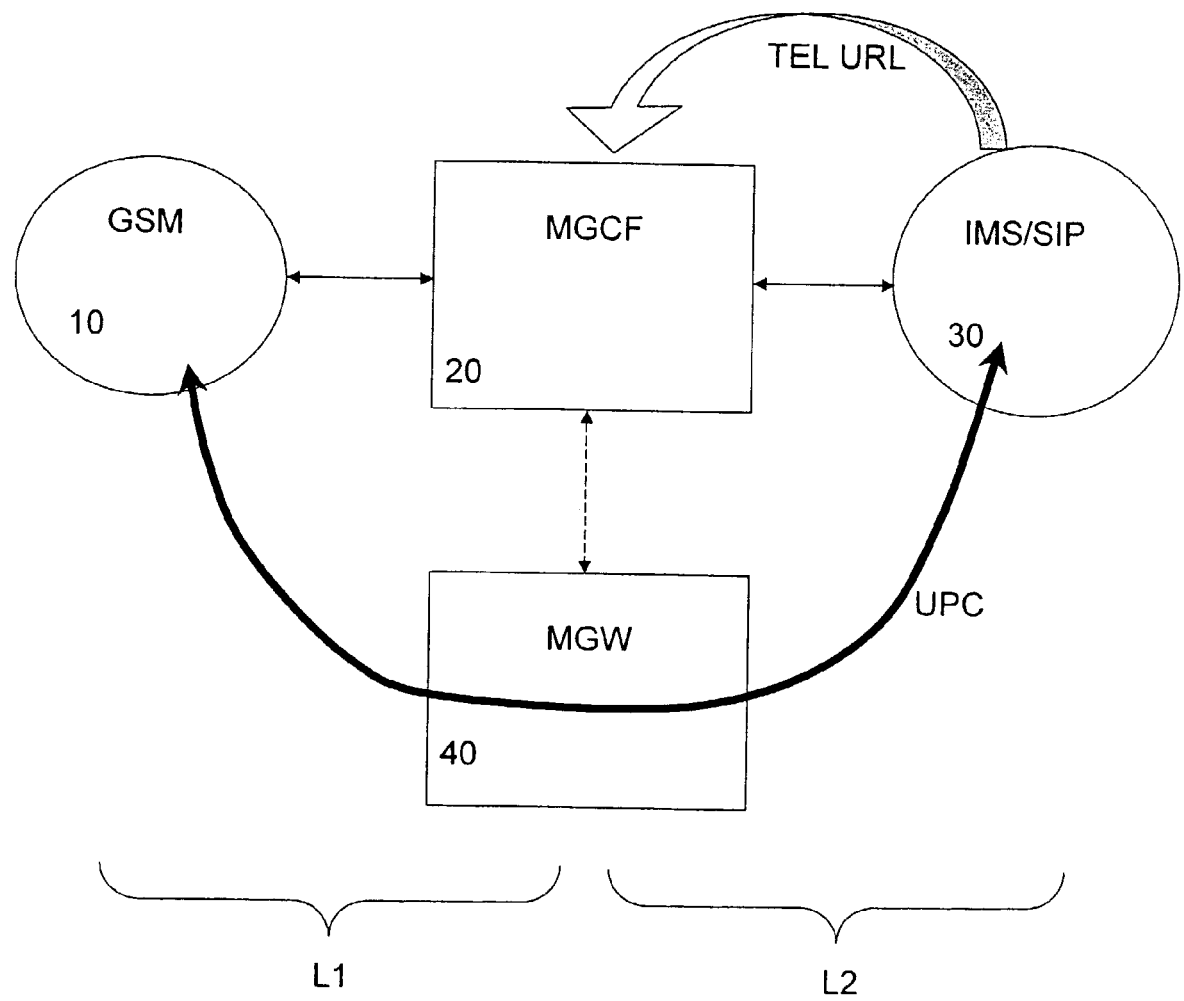
FIG. 1 shows a schematic diagram of a network configuration with an IMS domain according to the preferred embodiment.

FIG. 1 shows a schematic block diagram of the network architecture according to the preferred embodiment, wherein a GSM (Global System for Mobile communication) network 10 is connected to a SIP-based IMS network 30 via a Media Gateway Control Function (MGCF) 20 which controls a Media Gateway function (MGW) 40. The MGCF 20 is arranged to control the parts of a call state which pertain to connection control for media channels in the MGW 40. It communicates with Call Session Control Functions (CSCFs) as defined in the 3GPP specification TS 23.228. Furthermore, the MGCF 20 selects a CSCF depending on the routing number for incoming calls from legacy networks, such as the GSM network 10. The gateway functionality is achieved at the MGCF 20 by performing protocol conversion between ISUP and the IMS call control protocols. Out-of-band information assumed to be received in the MGCF 20 may be forwarded to a CSCF or the MGW 40.

The MGW 40 is arranged to terminate bearer channels from a CS network, e.g. the GSM network 10, and media streams from a PS network, e.g. the IMS network 30. The MGW 40 may support media conversion, bearer control and payload processing. The MGW 40 interacts with the MGCF 20 for resource control, owns and handles resources such as echo cancellers etc., and may include corresponding codec functions.

According to the preferred embodiment, interworking between the IMS network 30 and the CS domain, e.g. GSM network 10, is achieved by using the REFER method, e.g. in a SIP-based conferencing functionality. In particular, capability is added for subscribers located in the GSM network 10 to be invited in a conference or call initiated by using the respective SIP functionality. To achieve this, a SIP user sends a REFER message towards the MGCF 20, where the request URI is a telephony URI (TEL URI), such as "+442345567@operator.com". When the MGCF 20 receives the REFER message, it first sends an ISUP initial address message (IAM) to the GSM network 10 to thereby establish a first call leg LI towards the terminal device of the subscriber located in the CS domain, i.e. the GSM network 10. Then, the MGCF 20 establishes a parallel second call leg L2 towards the SIP user whose terminal device or UE is connected to the IMS network 30. The SIP user can also be e.g. a conference device.

After having established both call legs L1 and L2 the MGCF 20 connects these call legs to one session, wherein the user plane connections UPC are connected via the MGW 40. In particular, the MGCF 20 maps the received SIP REFER message to the ISUP IAM to be forwarded to the GSM network 10 and to SIP INVITE to be forwarded to the IMS network 30.

According to the IETF specification RFC 2543 for SIP, a call consists of all participants in a conference invited by a common source. A SIP call is identified by a globally unique call-ID. Thus, if a user is, for example invited to the same multicast session by several people, each of these invitations will be a unique call. A point-to-point Internet telephony conversation maps into a single SIP call. In a call-in conference, each participant uses a separate call to invite himself to a multiparty conference unit. A call leg is identified by the combination of call-ID, originator (From header) and final recipient (To header). SIP Uniform Resource Locators (URLs) are used within SIP messages to indicate the originator, current destination (Request-URI) and final recipient of a SIP request, and to specify redirection addresses.

According to the 3GPP specification TS 23.228, session transfers can be performed in SIP networks by using a REFER operation according to which a REFER message which includes a component element "Refer-To" and a component element "Referred-By" is issued to a network device or gateway arranged to transfer SIP sessions. Thus, according to the preferred embodiment, interworking between IP-based networks and circuit-switched networks can be achieved by triggering a session transfer operation.

Thus, in the case where the REFER message is received spontaneously or "out-of-blue" without any ongoing voice call, then it is required for the MGCF 20 to establish both a connection towards the conference server identified by the Refer-to header of the REFER message as well as a connection towards the CS subscriber, and to link those connections together. In this case the following two subscenarios may exist:

The REFER message contains an is Focus-indication. If this is included, then according to the SIP drafts, the situation is related to a conference service and so-called "third party conference invitation".

The REFER message does not contain the is Focus-indication but is still received out-of-blue by the MGCF 20. In this case an application server located in the IMS network 30 may use the REFER message to create a voice call between two subscribers either partially or non-partially located in the same domains (CS or IMS). As an example, the application server in the IMS network 30 may generate a REFER message towards the selected MGCF 20. The MGCF 20 may then establish a voice call towards the E.164 address identified in the Request-URI header and another voice call attempt towards the address (either E.164 or native SIP URI) identified in the Refer-to header.

On the other hand, in case the MGCF 20 already has an active ongoing voice call between the IMS network 30 and the terminal device of the subscriber located in the CS domain, then, when the REFER message is received for this given IMS session identified by Call ID, From and To headers, the REFER message can be related to a call-transfer-like functionality.

In the following, conventional signaling procedures for SIP conferencing are briefly described based on FIG. 2 to 4 in order to explain the SIP conferencing principles underlying the present invention.

Figure 2:
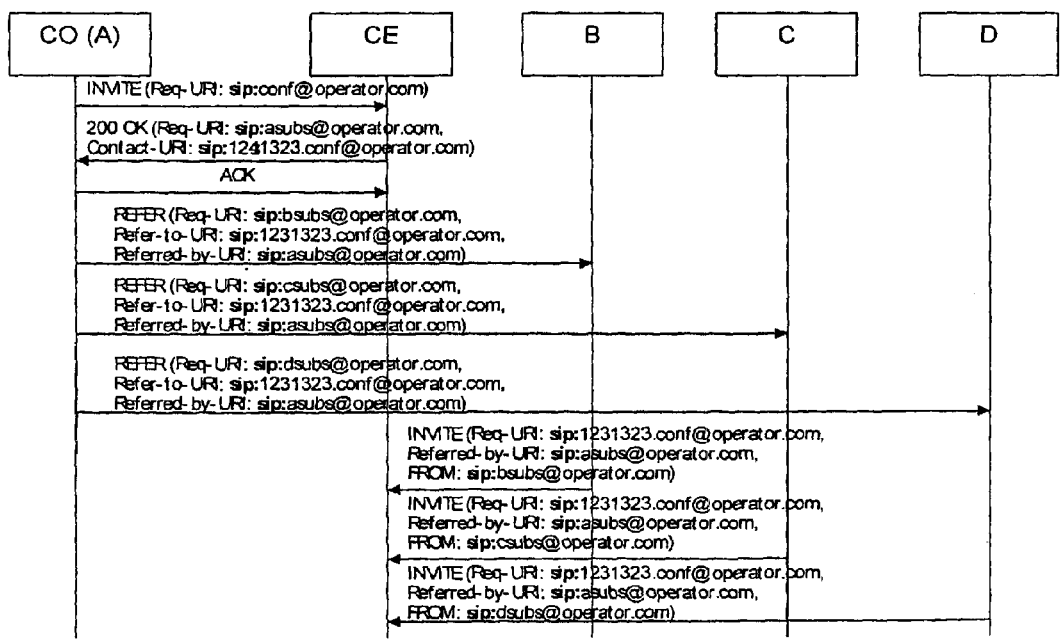
FIG. 2 shows a signaling diagram indicating a conventional AdHoc type of dial-in conferencing.

FIG. 2 shows a signaling diagram which represents the existing understanding on how SIP conferencing is established when other SIP-enabled participants B, C and D are invited to a conference by a conference owner A. This type of conferencing is known as AdHoc/Instant "dial-in" conferencing. In this procedure, a SIP INVITE message is forwarded to a conference equipment CE which acknowledges the invitation by a 200 OK message. Then, after an acknowledgement ACK by the conference owner CO, it sends corresponding REFER messages to each of the participants B, C and D, wherein the REFER message includes the URI received from the conference equipment CE as Refer-to address and the URI of the conference owner CO as the Referred-by address. In response to the REFER message, each of the participants B, C and D of the conference issue an INVITE message to the conference equipment CE with their own URI as originator address. Thereby, a SIP conference can be provided by establishing call legs from the conference equipment CE to the participants B, C and D.

Figure 3:
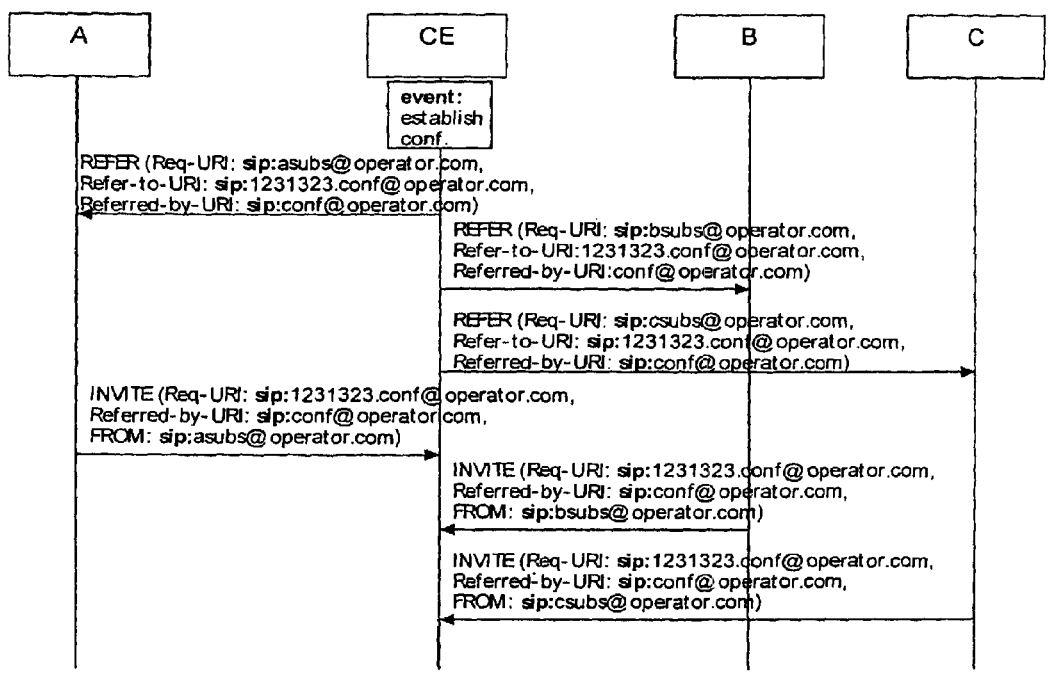
FIG. 3 shows a signaling diagram indicating a conventional server-initiated dial-in type of conferencing.

FIG. 3 shows a signaling diagram indicating an existing understanding on how SIP conference can be established by using a server-initiated dial-in method. In this alternative, an event, such as a time or application-dependent action triggers the conference establishment. In response to this event, the conference server or conference equipment CE begins to set up the sections by issuing corresponding REFER messages to the participants A, B and C. In response to the receipt of the REFER messages, each of the participants A to C issues an INVITE message to the conference equipment CE which establishes corresponding call legs. In this case, charging of the conference can be divided among the participants A to C.

Figure 4:
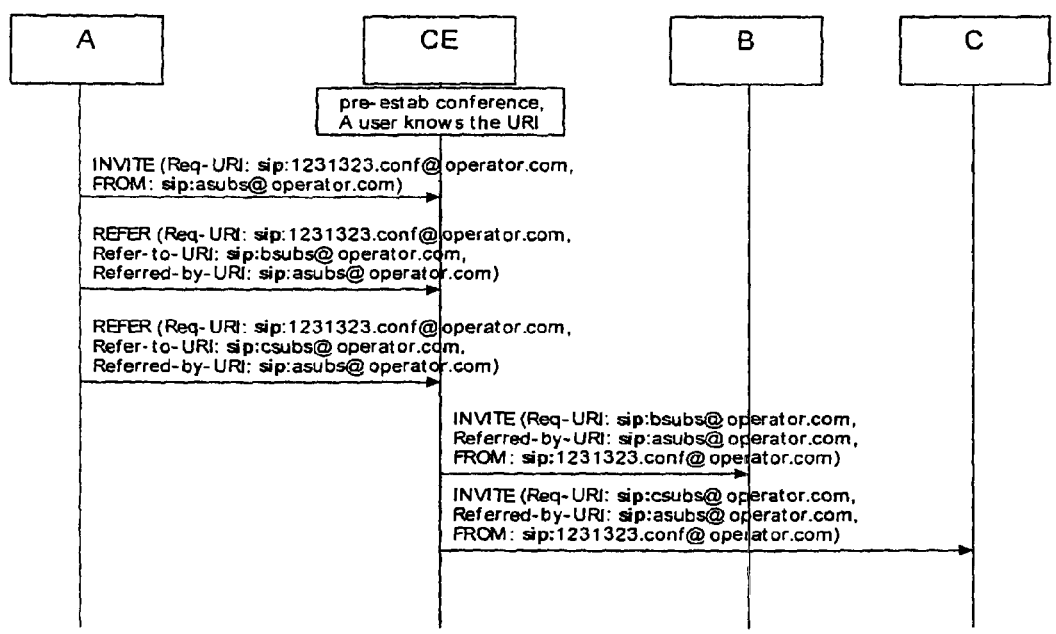
FIG. 4 shows a signaling diagram indicating a conventional end-user initiated dial-out type of conferencing.

FIG. 4 shows a signaling diagram representing another known alternative to establish an end-user initiated dial-out conference. In this example, the conference owner or initiator A commands the conference server or conference equipment CE to establish required sessions. As a prerequisite, the initiator A should know the URI of the conference equipment CE. After session invitation, REFER messages are issued by the initiator A to command the conference equipment CE for an invitation of the participants B and C. In this case, the charging model is different in that the initiator A of the conference would pay for the whole conference.

Figure 5:
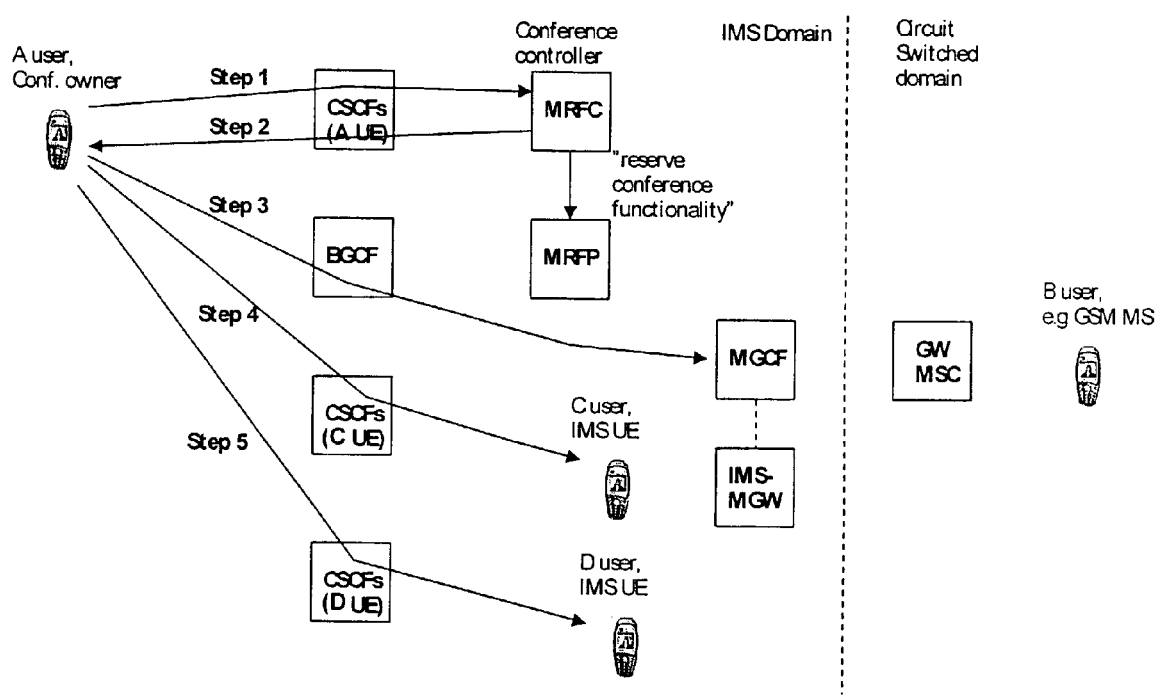
FIG. 5 shows a functional diagram indicating setup of a dial-in type of SIP conferencing according to the preferred embodiment.

FIG. 5 shows a functional diagram of a conference setup based on a dial-in type of SIP conferencing, wherein a participant from a CS domain, e.g. the GSM network 10 is added to the conference. The arrows in FIG. 5 represent steps of the setup procedure explained in the following.

In step 1, the conference owner or initiator A having a IMS/SIP enabled user equipment establishes the conference from a Multimedia Resource Function Controller (MRFC) located in the operator premises. The MRFC is an IMS entity which controls the media stream resources in a Multimedia Resource Function Processor (MRFP). Furthermore, the MRFC interprets information coming from the serving CSCFs which controls the user equipment of the initiator A, and controls the MRFP accordingly. In the present conference setup, the MRFC reserves the required conference functionality in the MRFP.

In step 2, the MRFC returns the SIP URI in a Contact-header to the initiator A. This URI can now be used in order to address the conference globally by other participants. In step 3, the initiator A issues a REFER message towards a participant B located in the CS domain, e.g. the GSM network 10. The REFER message contains a Request-URI with the TEL URI of the participant B, a Refer-to header with the SIP URI received from the MRFP in step 2, and a Referred-by header with the SIP URI of the initiator A who is the owner of the conference. The URI of the Refer-to header points to the reserved conference. The SIP proxies, i.e. CSCFs, in the IMS domain route the REFER message to a Border Gateway Control Function (BGCF) of the IMS domain, which selects a corresponding MGCF as a gateway to the desired participant candidate, i.e. participant B, in the CS domain.

Finally, in steps 4 and 5, the initiator A issues respective REFER messages towards the participants C and D located in the IMS domain. Here, the REFER message contains a Request-URI with the SIP URI of the participants C and D, respectively, a Refer-to header with the SIP URI pointing to the reserved conference and received from the MRFC in step 2, and a Referred-by header with the SIP URI of the initiator A who is the owner of the conference.

Figure 6:
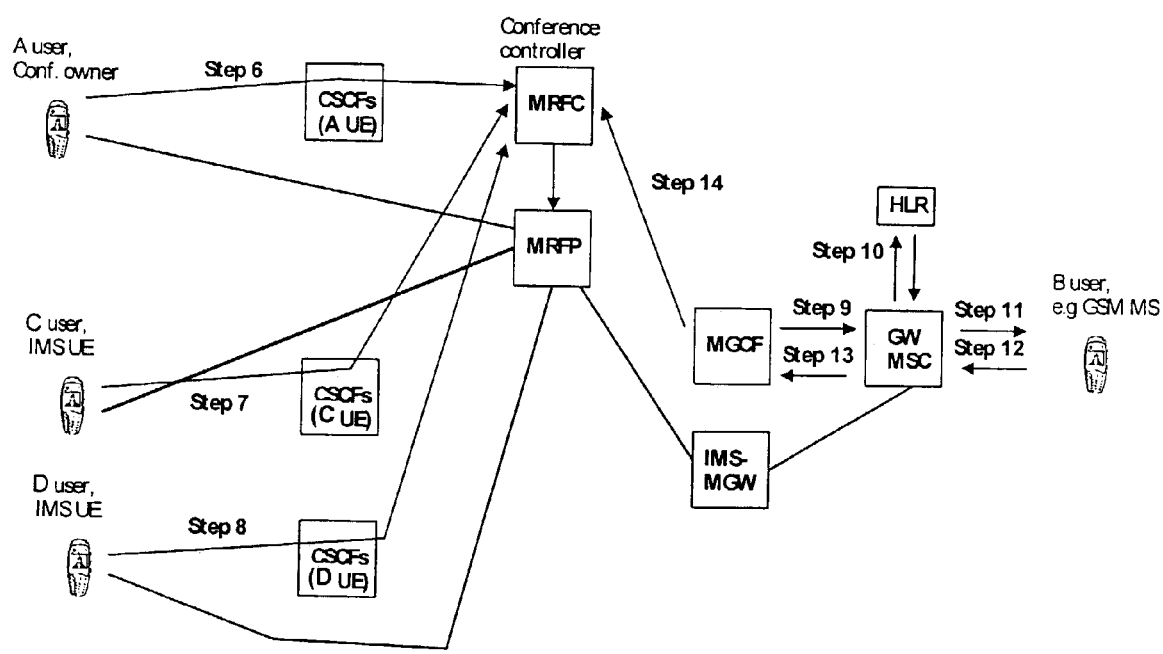
FIG. 6 shows a functional diagram indicating a session establishment towards the IMS domain, according to the preferred embodiment.

FIG. 6 shows a signaling diagram indicating the session establishments in both the IMS and CS domains towards the conference functionality MRFP located in the IMS domain. The arrows represent the steps explained in the following, while the connection lines represent the flow of user plane packets, i.e. speech samples or the like.

In step 6, the initiator A issues an INVITE message towards the SIP URI of the conference after successful completion of the REFER procedure. This way, the initiator A may participate in the conference. The INVITE message contains a Request-URI with the conference SIP URI, and a From header indicating the subscriber who is participating in the conference, i.e. initiator A. In step 7, the participant C generates a new INVITE message with a SIP URI addressing the conference. The INVITE message contains a Request-URI with the conference SIP URI, a From header with the SIP URI of the subscriber participating at the conference. In step 8, a similar INVITE message is generated by the other participant D of the IMS domain, wherein the INVITE message contains a Request-URI with the conference SIP URI, and a From header indicating the SIP URI of the subscriber D.

In step 9, the MGCF which represents the external participant B located in the CS domain takes active role in order to successfully inform the participant B of the conference. It is noted that participant B being a GSM subscriber cannot be contacted by using the REFER message as is the case with the native IMS/SIP subscribers C and D. Therefore, at first, the MGCF attempts to establish a CS call towards the participant B which has been identified by the TEL URI in the REFER message. Then, in step 10, a gateway mobile switching center (GW MSC) performs a query to the home location register (HLR) of the GSM network in order to route the call to the participant B. In step 11, a visiting MSC (VMSC) which currently controls the participant C tries to alert the participant B of an incoming speech call. If the participant B is already busy, the call may still be completed if the participant B has a "Call Waiting" supplementary service active. Otherwise, a Network Determinated User Busy (NDUB) event is triggered at the visited MSC and the call will be either cleared or forwarded.

In step 12, it is assumed that the call establishment is successful. In case of a failure of the call establishment, the MGCF may consider the REFER procedure to have failed as well. In step 13, an information of the successfully established call attempt is returned to the MGCF representing the participant B for the IMS domain. Optionally, the MGCF may connect or provide an appropriate tone or announcement for the participant B from an IMS-MGW functionality of the IMS domain at this point. Thereby, it is possible for the network to provide some in-band indication or notification to the participant B, such that it is noticed that a conference call will be established simultaneously by the network.

In step 14, the MGCF initiated call attempt towards the external participant B has been successfully completed, and the MGCF establishes a new SIP session towards the actual SIP URI received from the Refer-to header of the REFER message. After the session establishment has been completed, the MGCF removes the optional announcement or tone of the IMS-MGW for the participant B and through-connects the call leg on the IMS side and the call leg on the side of the participant B of the connections in the IMS-MGW. Thus, an end-to-end speech connection is established between the conference functionality of the IMS domain and the participant B in the CS domain.

Figure 7:
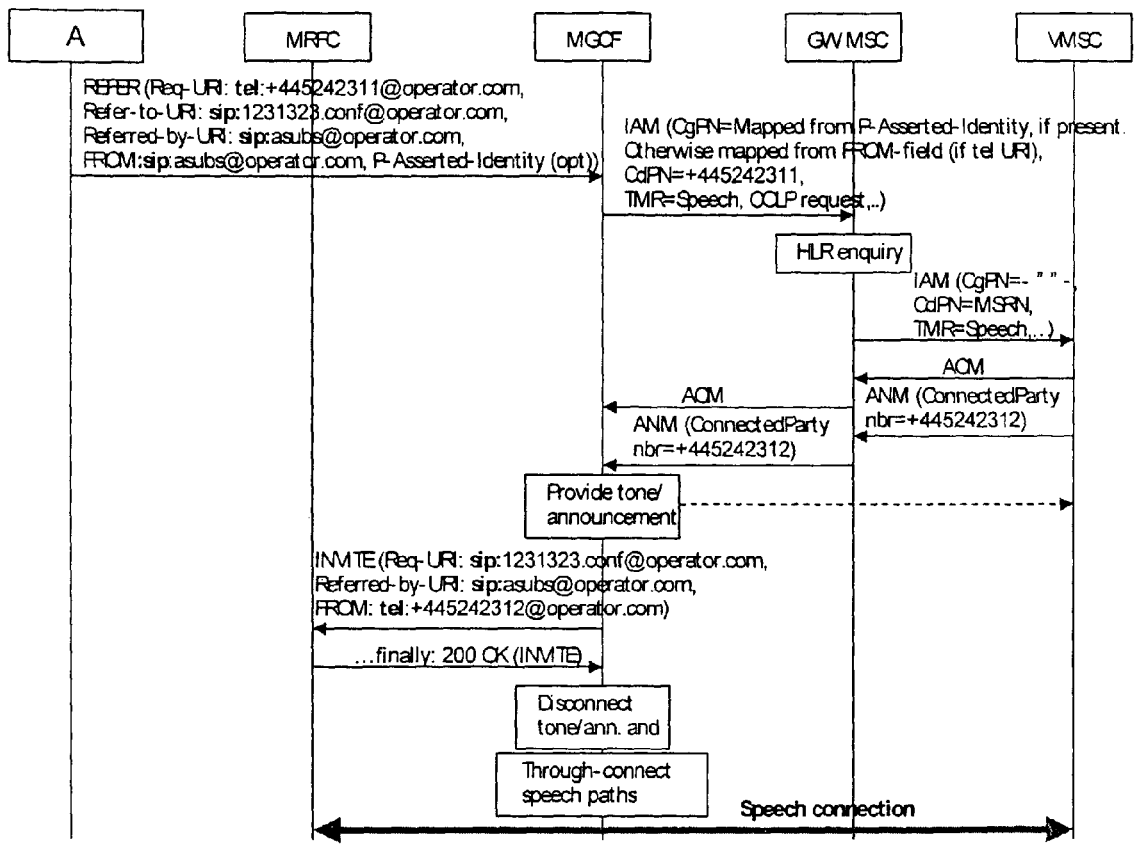
FIG. 7 shows a signaling diagram indicating an interworking signaling according to the preferred embodiment.

FIG. 7 shows a signaling diagram indicating a more detailed description of the message sequences exchanged in the procedures of FIGS. 4 and 5. According to FIG. 7, the MGCF is arranged to distinguish between different URIs received in the REFER message. To achieve this, an option may be provided by the MGCF to request the Connected Line identity of the CS domain subscriber B. Thereby, it can be checked whether the identity of the subscriber received in the Request-URI of the REFER message is the correct one. As an example, a call forwarding service which has occurred in the CS domain may have changed the other subscriber, i.e. the Referred-by header information.

According to FIG. 7, the initiator A issues the REFER message with the respective URIs to the MGCF which generates an IAM message to be routed to the GW MSC. After the HLR inquiry, the GW MSC forwards the IAM message to the visiting MSC (VMSC) which responds with an Address Complete Message (ACM) followed by an Answer message (ANM) indicating the telephone number of the requested participant B. The ACM and ANM are routed via the GW MSC to the MGCF which controls the IMS-MGW to provide the tone/announcement to the participant B. Then, the MGCF issues an INVITE message to the MRFC which finally responds with a 200 OK acknowledgement, when the SIP sessions to the other participants A, C and D have been successfully established. In response thereto, the MGCF controls the IMS-MGW to disconnect the tone/announcement and to through-connect the speech parts of the different call legs such that a single speech connection is established between the MRFC and the participant B.

Accordingly, the proposed SIP conferencing service uses a spontaneous REFER procedure without active session with the subscriber B located in the CS domain. The IMS/SIP specifications define that when a SIP user agent, which is an application that processes SIP requests, issues a REFER message towards another SIP user agent, the targeted user agent will try to initiate a SIP session towards the SIP/TEL URI identified in the Refer-to header. The session initiation attempt, i.e. the INVITE message, will contain in the Referred-by header an information of the user agent having initiated the REFER procedure. In order to achieve a similar behavior at system level, the MGCF tries to handle the REFER message as a trigger message to establish two calls or call legs and connect the user plane connections of these individual call legs together in the IMS-MSW it controls. The first call leg is established to the address contained in the Request field of the REFER message. This address may be a TEL URI format or a SIP URI with a telephone information representing the subscriber in the CS domain side. The second call leg is established to the address contained in the Refer-to header either after successful completion of the first call leg or during the establishment phase. Thus, the MGCF entity is provided with an application logic capable to establish a CS call towards the participant addressed by the TEL URI, and to establish a new SIP session towards the participant or device addressed by the SIP TEL URI included in the Refer-to header.

Bearer Independent Call Control (BICC) protocol may be used instead of ISUP when the invited party is located outside the IMS but IP bearer can still be utilized in MGCF towards the invited party.

Furthermore, it is possible to establish a connection between the MGCF and the conference server before the connection towards the invited party. This might be necessary to avoid so-called "early answer" situations in which a called user answers before the IP bearer is fully established. This situation is described, for example, in ITU-T Q.1912.1 and Q.1912.SIP.

Because the SIP REFER does not carry Session Description Protocol (SDP), an IAM message towards the invited party may need to be generated without a valid Session Description. Hence, the default values are assigned in other fields of the IAM (TMR=speech, . . . )

It is noted that the invention is not restricted to the preferred embodiment described above, but can be implemented in other service scenarios where a session transfer procedure, such as for example the REFER procedure, can be used. In these scenarios, a gateway function or element may receive the trigger message, e.g. the REFER message, during an active ongoing session from the IMS domain. This indicates that a subscriber has requested a call transfer to be performed by the gateway function or element. In particular, the active ongoing session is first established by forwarding a SIP INVITE message to the gateway function, e.g. MGCF 20, which may issue an ISUP IAM message to the subscriber in the CS domain. The call transfer may then be requested by forwarding a SIP REFER message to the gateway function, e.g. MGCF 20, which forwards a SIP INVITE message to the third party and/or other staff to which the call is to be transferred. Hence, the interworking procedure proposed in the present invention can be used in any call or session transfer procedures involving IP-based and CS network domains.

The invention claimed is:

1. A method comprising:
receiving a Session Initiation Protocol (SIP) Refer message for a conference call between a first device in a circuit-switched network and a second device in an Internet protocol (IP)-based network at a gateway device from the second device, the SIP Refer message including first address information associated with the first device, second address information associated with the second device, and third address information associated with a conference controller, wherein the first address information comprises a uniform resource indicator including a telephone number of the first device included in a Request field of the SIP Refer message;
sending a first message to the first device from the gateway device;
receiving a first response from the first device at the gateway device establishing a first call leg towards the first device based on the first address information;
requesting a subscriber identity from the first device and checking the first address information based on the requested subscriber identity;
sending a second message to the conference controller from the gateway device;
receiving a second response from the conference controller at the gateway device establishing a second call leg towards the conference controller located in the IP-based network based on the third address information obtained from the SIP Refer message; and
connecting the first and second call legs to form a single connection.

2. The method according to claim 1 wherein establishing the second call leg is performed before establishing the first call leg.

3. The method according to claim 1, wherein the third address information is included in a Refer-to header and the second address information is included in a Referred-by header.

4. The method according to claim 1, wherein the first address information comprises a Session Initiation Protocol Uniform Resource Indicator with telephone information.

5. The method according to claim 4, wherein the first address information further comprises a Telephony Uniform Resource Indicator.

6. The method according to claim 1, wherein the second message comprises a Session Initiation Protocol Invite message.

7. The method according to claim 6, further comprising providing an inband indication to the first device during the establishment of the second call leg.

8. The method according to claim 6, further comprising providing an in-band indication to the first device by the gateway device.

9. The method according to claim 1, wherein requesting the subscriber identity comprises a Connected Line identity.

10. The method according to claim 1, wherein the connecting comprises connecting user plane connections of the first and the second call legs together in a media gateway function controlled by the gateway device.

11. The method according to claim 1, wherein the first message comprises an initial address message of the circuit-switched network.

12. The method according to claim 11, wherein the initial address message comprises an Integrated Services Digital Network User Part Initial Address Message.

13. A gateway device configured:
to receive from an Internet protocol (IP)-based network a Session Initiation Protocol (SIP) Refer message for a conference call between a first device in a circuit-switched network and a second device in the IP-based network, the SIP Refer message comprising a first address information associated with the first device, a second address information associated with the second device, and third address information associated with a conference controller, wherein the first address information comprises a uniform resource indicator including a telephone number of the first device included in a Request field of the SIP Refer message;
in response to the SIP Refer message, to send a first message to the first device and to receive a first response from the first device to establish a first call leg towards the first device located in the circuit-switched network, based on the first address information;
to request a subscriber identity from the first device and check the first address information based on the requested subscriber identity;
to send a second message to the conference controller and to receive a second response from the conference controller to establish a second call leg towards the conference controller located in the IP-based network based on the third address information; and
further configured to connect the first and second call legs to form a single connection.

14. The gateway device according to claim 13, wherein a Session Initiation Protocol session is established with the second device.

15. The gateway device according to claim 14, wherein the Session Initiation Protocol session is established after the circuit-switched connection.

16. The gateway device according to claim 14, wherein the Session Initiation Protocol session is established before the circuit-switched connection.

17. The gateway device according to claim 13, further configured to connect the established first call leg to at least one of an in-band announcement and tone in order to notify a user at the first device of the intended connection setup.

18. The gateway device according to claim 13, comprising a Media Gateway Control Function of an IP Multimedia Subsystem network.

19. The gateway device according to claim 13, wherein connecting the first and second call legs comprises connecting user plane connections of the first and second call legs together in a media gateway function.

20. The gateway device according to claim 19, wherein the media gateway function comprises a Media Gateway Function of an IP Multimedia Subsystem network.

21. A network system for enabling interworking between different networks, the system comprising:
a gateway device configured to enable interworking between a circuit-switched network and the IP-based network, the gateway device configured:
to receive a Session Initiation Protocol (SIP) Refer message from an Internet protocol (IP)-based network for a conference call between a first device in the circuit-switched network and a second device in the IP-based network, the SIP Refer message comprising first address information associated with the first device, second address information associated with the second device, and third address information associated with a conference controller, wherein the first address information comprises a uniform resource indicator including a telephone number of the first device included in a Request field of the SIP Refer message;
in response to the received SIP Refer message, to send a first message to the first device based on the first address information and to receive a first response from the first device to establish a first call leg towards the first device;
to request a subscriber identity from the first device and check the first address information based on the requested subscriber identity;
to send a second message to the conference controller based on the third address information and to receive a second response from the conference controller to establish a second call leg towards the conference controller; and
to connect the first and second call legs to form a single connection.

22. The system according to claim 21, wherein the circuit-switched network comprises a Global System for Mobile Communication network.

23. The system according to claim 21, wherein the IP-based network comprises an IP Multimedia Subsystem network.

24. A gateway device comprising:
receiver configured to receive a first address information of a first device located in a circuit-switched network in a Session Initiation Protocol (SIP) Refer message, the SIP Refer message received from a second device in an Internet protocol (IP)-based network for a conference call between the first device and the second device, the SIP Refer message comprising second address information associated with the second device and third address information associated with a conference controller, wherein the first address information comprises a uniform resource indicator including a telephone number of the first device included in a Request field of the SIP Refer message;
transmitter configured to send a first message to the first device based on the first address information and for sending a second message to the conference controller based on the third address information;
wherein a subscriber identity is requested from the first device and means for checking the first address information based on the requested subscriber identity;
wherein the receiver is further configured to receive a first response from the first device for establishing a first call leg towards the first device based on the first address information;
wherein the receiver is further configured to receive a second response from the conference controller for establishing a second call leg towards the conference controller located in the IP-based network based on the third address information obtained from the SIP Refer message; and
wherein the first and second call legs are connected to form a single connection.

25. The gateway device according to claim 24, wherein the second call leg establishes a SIP session between the gateway device and the IP-based network.

26. The gateway device according to claim 25, wherein the SIP session is established before the first call leg.

* * * * *

UNITED STATES PATENT AND TRADEMARK OFFICE
CERTIFICATE OF CORRECTION

PATENT NO.        : 7,898,990 B2  
APPLICATION NO.   : 10/442183  
DATED             : March 1, 2011  
INVENTOR(S)       : Kallio et al.

Page 1 of 1

It is certified that error appears in the above-identified patent and that said Letters Patent is hereby corrected as shown below:

Column 9, line 54, in Claim 7, delete "inband" and insert -- in-band --.

Signed and Sealed this
Nineteenth Day of July, 2011

David J. Kappos
*Director of the United States Patent and Trademark Office*